Jan. 11, 1927.
A. MARTIN
ELECTRIC WATER HEATER
Filed Sept. 27, 1923    2 Sheets-Sheet 1
1,613,714
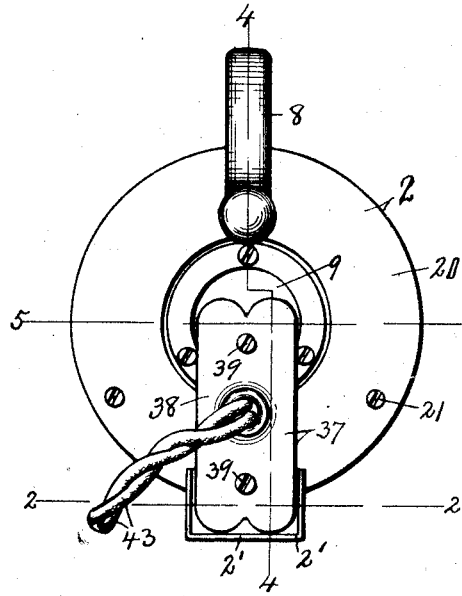
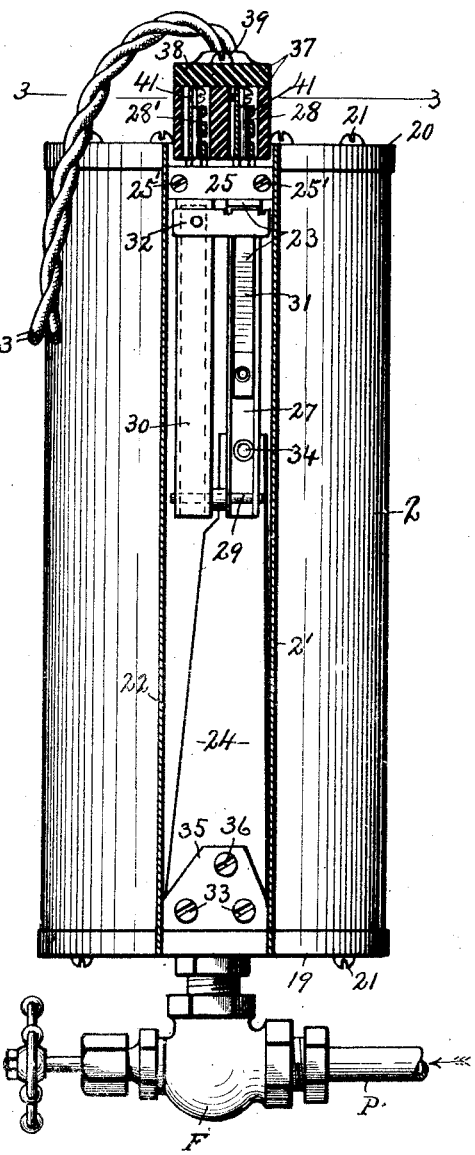
INVENTOR
A. Martin
BY Howard P. Denison
ATTORNEY Jan. 11, 1927.
A. MARTIN
1,613,714
ELECTRIC WATER HEATER
Filed Sept. 27, 1923   2 Sheets-Sheet 2
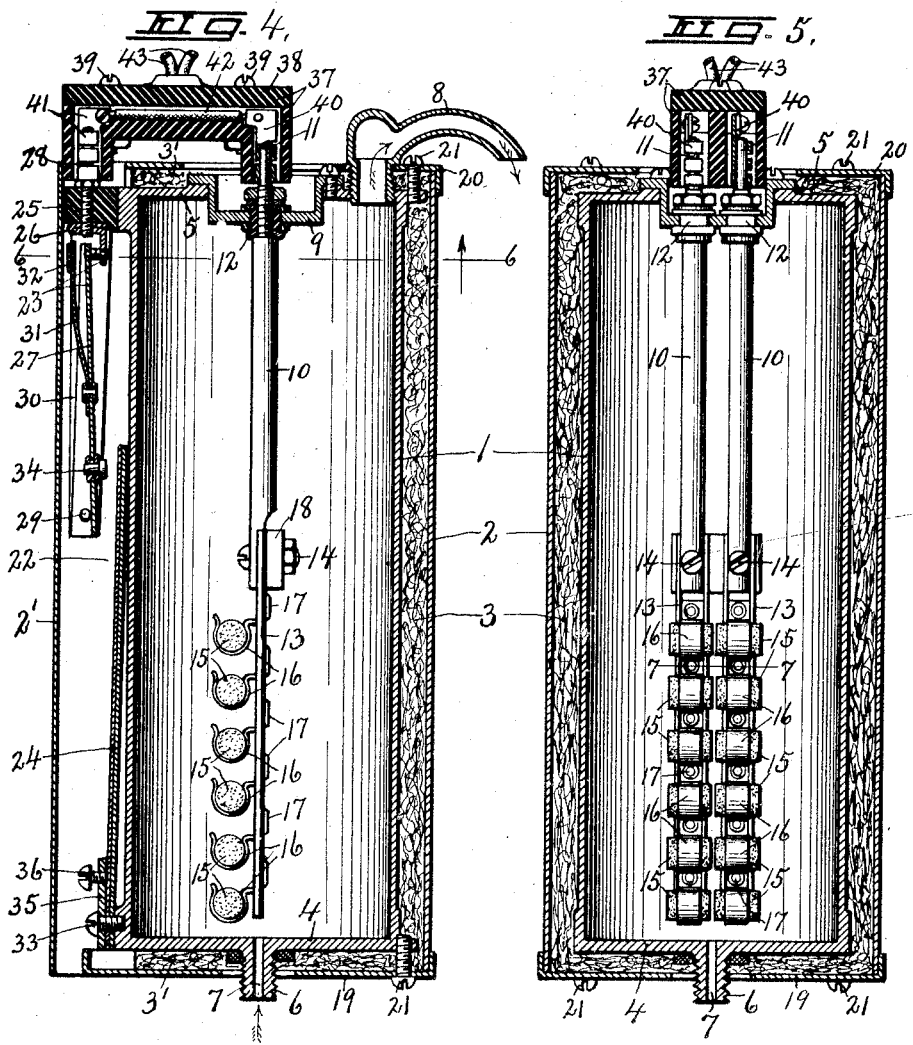
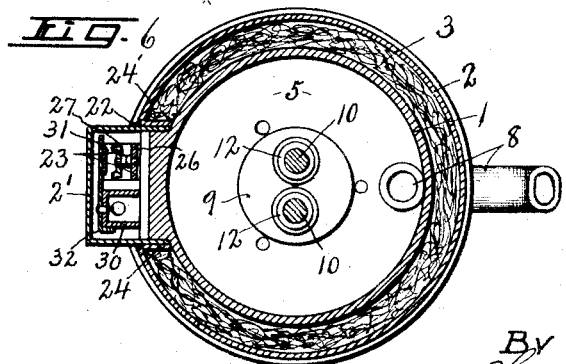
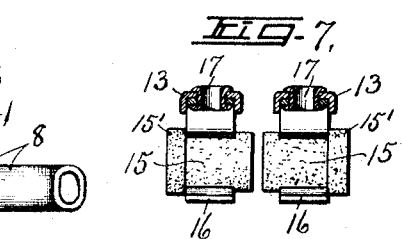
INVENTOR
A. Martin
By
Edward P. Denison
ATTORNEY Patented Jan. 11, 1927.

1,613,714

UNITED STATES PATENT OFFICE.

ALPHONSE MARTIN, OF OGDENSBURG, NEW YORK, ASSIGNOR OF FIFTY-ONE ONE-HUNDREDTHS TO MAX KATZMAN, OF OGDENSBURG, NEW YORK.

ELECTRIC WATER HEATER.

Application filed September 27, 1923. Serial No. 665,168.

This invention relates to an electric water heater of the class set forth in my Patent No. 1,474,638, November 20, 1923, in that the electrodes are supported within a suitable container for direct contact with the water therein for the purpose of maintaining a limited supply of hot water to be used when desired.

One of the specific differences of my present invention over that shown in my patent referred to, is that the thermo-electric means actuated by varying temperatures of the liquid in the container for controlling the temperature of said liquid involves the use of a flat thermostatic bar normally in direct contact with the periphery of the liquid-containing shell for the purpose of increasing its sensitivity to the varying temperatures of the liquid and thereby establishing a closer regulation of said temperature by its action upon the separate electric switch controlling the heating circuit.

This invention is further differentiated from the devices shown in the application referred to in that the liquid containing shell is surrounded and inclosed by a protective shell and a jacket of suitable material such as asbestos having a low degree of heat conductivity for the purpose of expediting the heating of the water and greatly reducing the radiation of heat therefrom, to the outer shell or case.

Another specific difference consists in bringing the terminals of the switch into convenient relation for the reception of an insulator cap adapted to embrace both sets of terminals when adjusted for use and capable of removal to disconnect the heating circuit from the switch and electrodes when desired.

The object of these specific differences as pointed out is to increase the efficiency of the device as a whole, by expediting the heating of the water in the container and by close regulation of the temperature thereof.

Other objects and uses relating to specific parts of the device will be brought out in the following description.

In the drawings:

Figure 1 is a top plan of an electric water heater embodying the various features of this invention.

Figure 2 is a vertical sectional view partly in elevation taken on line 2—2, Figure 1.

Figure 3 is a horizontal sectional view partly in top plan taken in the plane of line 3—3, Figure 2.

Figures 4 and 5 are vertical sectional views taken respectively on lines 4—4, and 5—5, Figure 1.

Figure 6 is an inverted horizontal sectional view taken in the plane of line 6—6, Figure 4.

Figure 7 is an enlarged detail horizontal sectional view taken on line 7—7, Figure 5.

As illustrated, this device comprises an inner upright cylindrical water containing shell —1—, an outer cylindrical shell or casing —2— having the major portion thereof concentric with and in spaced relation to the inner shell for receiving a jacket —3— of asbestos or equivalent heat insulating material having a relatively low degree of heat conductivity for the purpose of expediting the heating of the liquid in the container —1— and retaining said heat against excessive radiation, to the outer shell.

The inner receptacle —1— is provided with lower and upper end heads —4— and —5— forming liquid tight joints with the main cylindrical body, the lower head being provided with a central downwardly projecting nipple —6— adapted to be connected to any suitable water supply pipe —P— or to a water faucet —F— and is provided with a relatively small inlet —7— leading to the interior of the container —1— for supplying water thereto from the bottom upwardly.

The upper head —5— is provided at one side of its center, with an upwardly and laterally projecting outlet nozzle —8— having tight screw connection therewith for discharging the water or other liquid which may be admitted to the interior of the container —1— after passing from the bottom to the top thereof.

The upper head is also provided with a central bushing —9— secured in a corresponding opening therein to form a water tight joint therewith and also serving as a support for a pair of electrode supporting bars —10— whereby the bushing with the bars —10— and electrodes thereon, may be made up as a unit and placed in operative position within the container or withdrawn therefrom as may be desired for repairs or other adjustments.

The upper ends of the bars —10— are extended through and some distance above the bushing —9— to form terminals —11— for the electrodes, the portions of the rods —10— extending through the bushing —9— being insulated therefrom by insulator bushings —12—, which also serve to insulate the bars —10— one from the other.

That is, the bars —10— are rigidly clamped at their upper ends to the bushing —9— in parallel spaced relation and are provided at their lower ends with extensions —13— preferably of U-shaped cross section, and secured in parallel spaced relation to the bars —10— by clamping screws —14—, said bars and their extensions —13— being made of electric conducting material and when assembled, extend from the upper head —5— to points in proximity to the lower head —4—.

The bars —10— and their extensions —13— are of approximately the same length so that the bars —13— extend from points in proximity to the lower head —4— upwardly nearly half the length of the container for the purpose of supporting a multiplicity of, in this instance six, pairs of relatively small cylindrical carbon electrodes —15— in vertically spaced relation.

The electrodes of each pair are supported by spring clips —16— in axial alinement with each other and also in axially spaced relation to form an intervening gap across which the electric current may pass when the electrodes are energized, the clips of each pair being secured by rivets —17— to their respective extensions —13— of the bars —10— to hold them in fixed spaced relation transversely of said extensions.

That is, one end of each clip —16— is bent upwardly and seated in the lengthwise channel of the corresponding extension —13— where it is held in place by the rivets —17— and by the lengthwise flanges of the extensions as shown more clearly in Figure 7, the flanges of said extensions serving to hold the clips in horizontal alinement against turning and thereby serving to hold the corresponding electrodes in axial alinement.

The portions of the clips which engage the electrodes are preferably made in the form of open loops with their open sides at the top and their outer ends spring tensioned inwardly to permit the electrodes to be removed by upward displacement when desired, while the tension of the loops serve to frictionally hold the electrodes in operative position.

The portions of the bars —10— and extensions —13— at their junctions, one with the other are braced against relative lateral movement by a brace bar —18— of insulating material held in place by the clamping bolts —14— and together with the bushing —9— serve to hold the bars and their extensions —13— in parallel spaced relation throughout their lengths and is of sufficient distance apart to insulate them one from the other, except as the current passes through the electrodes of each pair and across the intervening gaps —a—.

The outer ends of the electrodes are enlarged to form annular flanges —15'— which engage the adjacent edges of the corresponding clips to hold said electrodes in axially spaced relation against contacting with each other and thereby to assure the desired intervening air gaps.

The opposite ends of the outer casing —2— extend beyond the corresponding end heads —4— and —5— of the inner shell and are provided with caps —19— and —20— secured to the inner end heads by screws —21— to form intervening spaces in which suitable heat insulating material as —3'— similar to that previously described is placed to additionally resist the radiation of heat from the inner shell to the outer shell.

One side of the outer shell —2— is slotted longitudinally to form a lengthwise recess —22— extending from the lower cap —19— to the upper cap —20— and also extending through the jacket —3— to the periphery of the inner shell —1— for receiving an electric switch —23— and a thermostatic bar —24—, and also serving to receive a supplemental section —2'— of the outer case —2—.

The edges of the outer shell —2— forming the upright side walls of the recess —22— are provided with inturned flanges —24'— abutting against the periphery of the inner shell to assist in holding said shells in concentric spaced relation and also serving as guides for the supplemental case section —2'—.

An insulator block —25— is secured by screws —25'— to the outer face of the upper end of the inner shell —1— within the recess —22— for receiving and supporting the electric switch —23— having a relatively fixed contact member —26— and a movable contact member —27—, the fixed member —26— being secured to the under side of the insulator block by a binding post or terminal —28—, which extends through and some distance above said insulator block to form one of the switch terminals —28—.

The movable switch member —27— consists of a vertically elongated sheet metal bar preferably of U-shaped cross section extending downwardly from the under side of the insulator block —25— and having its lower end pivoted at —29— to a vertical supporting bar —30— which is also preferably made of sheet metal of U-shaped cross section, and has its upper end secured by another binding post or switch terminal —28'— to the under side of the insulator block —25— similar to the binding post or terminal —28— in that it extends through and some distance above said insulator block parallel with the terminal —28— and in spaced relation thereto.

The switch terminals —28— and —28'— and electrode terminals —11— are preferably disposed in parallel vertical planes and project above the upper heads —5— and —20— of the inner and outer shells —1— and —2— for convenience of connection with an electric source of supply in a manner presently described.

The movable switch member —27— is also provided with a light flat spring —31— engaging a relatively fixed member —32— on the upper end of the bar —30— for normally holding the movable switch member —27— in electrical contact with the switch member —26—. (See Figure 4.)

The thermostatic bar —24— preferably consists of two pieces of flat metal of different temperature co-efficients secured togther face to face and having their lower ends secured by screws to the outer face of the lower end of the inner shell —1— within the recess —22— and their upper ends lying in close proximity to the adjacent outer face of the inner water containing shell —1— and between said shell, and the lower end of the movable switch member —27— which is provided with an insulator button —34— adapted to be engaged by the upper end of the thermostatic bar —24— when the latter is deflected outwardly.

A plate —35— is secured by the screw —33— to the outer face of the lower end of thermostatic bar —24— and carries an adjusting screw —36— by which the thermostatic bar —24— may be adjusted to contact with the adjacent side of the water containing shell —1—.

This thermostatic bar —24— is arranged to normally press against the adjacent side of the shell —1— by its own tension under low temperatures of the water contained in said shell and also to deflect outwardly against the button —34— to open the normally closed switch —23— and thereby to break the heating circuit through the electrodes when the water in the container is heated to a predetermined degree.

Suitable devices are provided for connecting the electrode terminals with the switch terminals and with a source of current supply and for this purpose I have provided a chambered insulator block —37— having a removable cap —38— to permit access to the chamber but normally held in place by screws —39—.

This insulator block —37— constitutes a coupling member of sufficient length to cover the electrode terminals and switch terminals and is provided in its opposite ends with sockets open at the bottom and containing separate pairs of electric conducting sleeves or clips —40— and —41— for sliding frictional engagement with the electrode terminals.

One of the terminal clips —40— is electrically connected by a wire —42— to the corresponding switch terminal clip —41— while the other clips —40— and —41— are connected to lead wires —43— which in turn may be provided with the usual socket plug for connection with the electric circuit of an ordinary incandescent lamp socket for supplying current to the electrodes —15— through the medium of the switch —23—.

This mounting of the terminal clips —40— and —41— in the insulator coupling member —38— permits the water heater to be easily and quickly attached to or detached from any suitable electric circuit commonly used in residences and other places where the electric water heater might be of service.

The supplemental casing —2'— constitutes with the adjacent side of the inner shell —1—, a housing for the electric switch —23— and thermostatic bar —24— to protect the same against contact with external objects, but is removably held in place by frictional engagement with side walls —24— of the recess —22— and also with the lower and upper heads —19— and —20— of the outer casing —2—.

*Operation.*

When it is desired to heat a quantity of water, equal to the capacity of the inner shell —1,— the faucet or valve —F— in the supply pipe —P— may be opened to allow the water to flow into the container —1— until the latter is filled and begins to overflow through the open outlet —8— at which time, the valve is closed to cut off the further supply of water and to allow the heating of the water in the container by the current passing across the gaps between the several electrodes of each pair, it being understood that during this initial flow of the water into the container, the electric switch —23— will be closed and will remain closed until the temperature of the water in the container reaches a certain degree determined by previous adjustment of the thermostatic bar —24—.

When the water in the container is heated to the proper temperature, the heat thereof will be transmitted to the shell —1— and thence to the thermostatic bar —24— causing the latter to deflect against the insulator button —34— and thereby to open the switch —23— against the action of its retracting spring —31—.

In case the hot water should not be used immediately and its temperature should drop below the predetermined degree, the thermostatic bar —24— will be deflected away from the button —34— toward the shell —1— thereby permitting the switch —23— to again close for supplying current to the electrodes —15— and re-establishing the desired temperature of the water.

By placing the thermostatic bar —24— flatwise against the periphery of the shell —1— renders said bar more sensitive to slight variations in temperature of the water and thereby establishes a close regulation and maintenance of the desired temperature and assuring a limited supply of hot water at any time.

It is evident, however, that a continuous supply of hot water could be maintained in the container after the water passes therethrough by regulating the flow of the water to the container or by varying the size or number of the electrodes in the container to receive a greater amount of current and therefore, I do not wish to limit myself to the heating of a limited supply of water at one time.

I claim:

In an electric water heater, a container for the water to be heated having a heat insulating jacket open at one side from bottom to top, an electric heater within the container having terminals extending through the top of the container, of an electric thermostat switch in said opening having terminals at the top of the container, and a coupling at the top of the container for connecting the heater terminals with the switch terminals.

In witness whereof I have hereunto set my hand this 21st day of September, 1923.

ALPHONSE MARTIN.